Patented Sept. 9, 1941

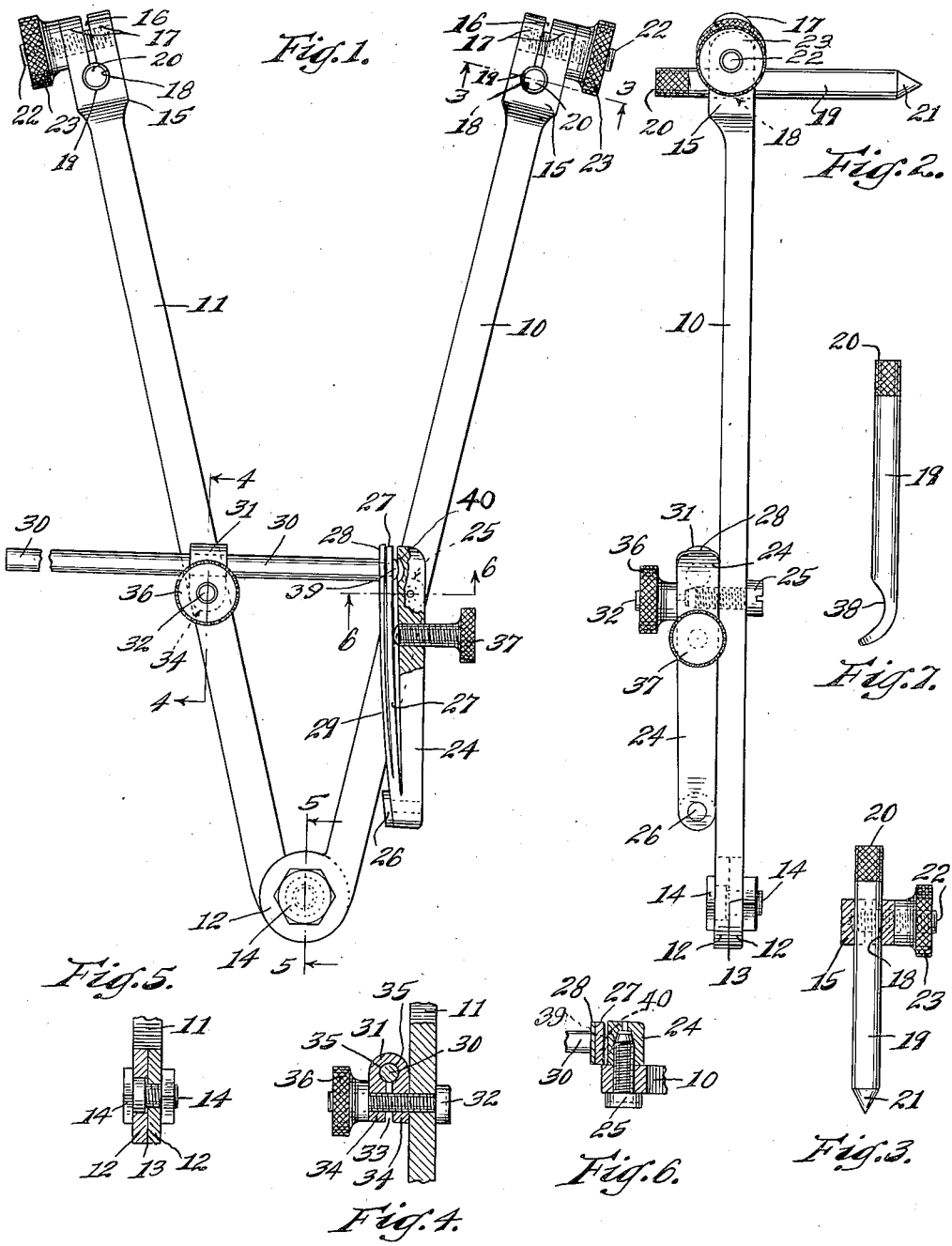

2,255,328

UNITED STATES PATENT OFFICE 2,255,328

SPACE MEASURING DEVICE

John Nyberg, Chicago, Ill.

Application December 14, 1940, Serial No. 370,173

8 Claims. (Cl. 33—154)

This invention relates to a space measuring device or dividers which may be used as calipers and the primary object of the invention is to provide a novel, simple, practical and accurate instrument for use by machinists or other craftsmen such as for marking off uniform spaces on objects for various purposes, including the determining and marking on metal of the positions and spacing of rivets or bolts such as on tanks or containers, metal sheets or otherwise, and after the device is set, to permit the spacing to be stepped off or advanced from an original marking, especially where uniform spaces are desired and by striking on a pointed pin or punch to give an accurate and readily visible marking for drilling holes to receive the rivets or bolts and for other purposes.

Another object of the invention is to make provision for the use of the device as calipers and to so construct it that very accurate adjustments can be obtained and the device fixed in an adjusted position.

Further objects and advantages will appear and be brought out more fully in the following specification, reference being had to the accompanying drawing, in which:

Fig. 1 is a plan view of a space measuring device or instrument made in accordance with my invention for use as dividers or calipers;

Fig. 2 is a side view of the instrument;

Fig. 3 is a sectional view taken on the line 3—3 of Fig. 1;

Fig. 4 is a sectional view taken on the line 4—4 of Fig. 1;

Fig. 5 is a sectional view taken on the line 5—5 of Fig. 1;

Fig. 6 is a sectional view taken on the line 6—6 of Fig. 1; and

Fig. 7 is an elevation showing means for use of the device as calipers.

Referring more particularly to the drawing, the instrument or space measuring device consists of two arms 10 and 11 each provided with an enlarged flat circular rabbeted end 12 fitting together and pivotally connected at 13 by means of a bolt 14 to provide a firm flat bearing to maintain the arms in alignment and permit the necessary angular movements thereof relatively in separating or collapsing together when in use and not in use respectively. The arms 10 and 11 are preferably, although not necessarily, tapered toward their free ends and may be of rectangular or other cross section. At their free ends, they are provided with enlargements 15 split vertically as at 16 to provide split clamps or jaws 17 which may be of rectangular or other general form with their bottom faces flush with the bottom faces of the arms but enlarged at the top and side, although this is not absolutely necessary. The jaws at the inner ends of the bifurcations are provided with opposed co-acting semi-circular recesses or bores 18 adapted to receive cylindrical or other vertical marking pins 19 which may have flat heads 20 and pointed ends 21 producing punches for marking a surface, the pins being suitably hardened for marking on metal if desired. These pins may be both of the same length or one slightly longer than the other or otherwise, as desired, and are disposed perpendicularly to the lengthwise plane of the arms with the pointed ends projecting downwardly from the flush faces. Clamping means are provided for the split clamps or jaws 17 such as screws 22 anchored in one jaw of each arm or clamp, preferably the inner jaw and extending loosely through an opening in the outer jaw for engagement by knurled nuts 23 so that the jaws can be clamped tightly against the pins or punches 17.

In order to adjust the arms and the points of the pins in properly spaced relation as desired by varying the angular relation of the arms to each other and to clamp the same, the following construction is provided. Pivoted to one arm, such as the arm 10, is a short arm or bar 24 pivotally mounted as at 25 on a screw, loose through the arm 10 or otherwise held from turning in said arm, or by means of a rivet. In either event, the pin projects upwardly from the arm 10 and pivotally mounts the bar 24. Riveted at 26 to the inner face of the bar 24 is a heavy spring 27 and a light spring 28 inwardly thereof but slightly longer than the heavy spring so as to bend or buckle out intermediately as shown at 29 to insure greater tension and resistance to flexing as will be later described. These springs may be separate from the bar or short arm 24, or as shown, may be sawed, severed or cut from the same piece of hardened or spring metal as said bar. Riveted through the free ends of the springs 27 and 28 is a rod 30 which passes through apertures in the free ends of the springs but free of the bar. Owing to the fact that the inner or light spring 28 is slightly longer than the outer or heavy spring 27 so that the radial distance to the center of its aperture which receives the rod 30 is greater than the corresponding distance of the aperture in the spring 27 which also receives the rod and in which the end thereof is anchored, the inner spring is slightly buckled or bent in the center to offset its outer face from the inner face of the spring 27 and the kerf which divides the spring 27 from the inner face of the bar 24 extends deeper than the corresponding kerf which separates the springs, a corresponding greater tension is provided in the inner spring with the tendency to bind on the rod and throw the rod outwardly or toward the free ends of the arms 10 and 11 so as to also friction its engagement with a split clamp 31 pivotally mounted to turn on the arm 11 as by means of a screw or other form of pivot 32 opposite the pivot 25 of the bar 24. The clamp 31 is split horizontally as at 33 to provide jaws 34 also horizontally positioned with coacting opposed semicircular recesses or bore 35 receiving the rod 30 frictionally therethrough. A knurled nut 36 is mounted on the pivot screw 32 to clamp the jaws of the split clamp 31 against the rod 30 to hold the arms 10 and 11 and the tapered pins or punches carried thereby in a given spaced relation. However, this spacing may be more accurately regulated or adjusted by an adjusting screw 37 which is threaded through the bar 24 inwardly of its pivot on the arm 10 to engage the inner face of the spring or blade thereof. This adjustment is obtained before or after the nut 36 is tightened and renders it possible to secure very minute and accurate adjustments.

In the use of the device shown in Figs. 1 to 6, inclusive, for marking off uniform spaces on objects for various purposes such as on metal, metal drums or the like for determining the positions of rivets or bolts or otherwise, a suitable marking is made on the metal or other object and then by stepping off the proper spaces due to the spacing of the pins or punches from such marking as a starting point, a uniform spacing may be obtained from such markings for drilling holes to take the bolts or rivets, or otherwise, such as where other members may be fastened. When the proper space is stepped off, it is only necessary to strike the pins or punches to give the necessary progressive marking and this is facilitated by reason of the pins being disposed vertically or perpendicularly to the arms. The fact that the pins have flat heads also facilitates their application, removal or vertical adjustment or the substitution of curved pins 38 as shown in Fig. 7 of the drawing for use as a modified construction in the manner of calipers primarily for inside measurements. Obviously, the marking may be used for metal tanks or drums or sheets of metal or other material, striking the pins or punches in the manner described with a hammer or other tool to provide suitable markings to indicate the proper spacing and positioning of the rivets, bolts or other purposes such as the location of fastening means for other structural members or otherwise and by stepping the device along a proper line or circle to give equal and accurate spacing and positioning of the next marking for the desired purpose. It is also to be understood that when the spacing is originally set, the points are set at the required distance or spacing apart from one another by means of a rule or other suitable measuring device.

In this connection it should be noted that the bar 24 is fulcrumed between its ends on the pivot 25 and that the rod 30 is connected to the springs 27 and 28 opposite the short arm of the lever thus produced by the manner in which the bar 24 is pivotally mounted and while the upset or reduced riveted end of the rod 30 projects as at 39 and is accommodated in a recess 40 in the inner face of the bar 24, it is to be understood that the riveted end of the rod 30 may be flush with the outer face of the spring 27 so that the recess 40 will be unnecessary. Also, the screw 37 is disposed between the pivot or fulcrum point 25 and the anchored ends of the springs through the long arm of the bar 24 to act on the springs intermediately and the bar swings on its pivot with adjustment of separation of the arms 10 and 11 and spacing of the pins or movement of the rod 30 to compensate for changes in the angular relation of the rod 30 to the arm 10 and the turning of the clamp 31 but the essential feature is the pivoting of the bar 24 owing to the rigid angular relation of the rod 30 to the springs and thus the bar.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. A space measuring device of the class described including a pair of arms pivotally connected at one end and disposed in the same plane, clamps at the free ends of the arms, pointed pins held in said clamps and extending in one direction substantially at right angles to the plane of the arms, and an adjustable connection between the arms, said connection including a bar pivoted to one of the aforesaid arms, a spring mounted on the bar, a clamp carried by the other arm and a rod carried by the spring and engaged with the last mentioned clamp for adjustment along the length of the rod to vary the spacing of the arms.

2. A device of the character described including a pair of pivoted arms, perpendicular pins at the free ends of the arms, a supplemental arm pivoted to one of the aforesaid arms intermediately to swing in a plane parallel thereto, the supplemental arm extending in the direction of the pivot of the first arms, spring strips secured to the inner face of the supplemental arm adjacent its free end, a rod connected to the spring strips and extending across the other arm in the same plane with the supplemental arm, and a clamp mounted on the other arm to receive and clamp the rod.

3. A device of the character described including a pair of pivoted arms, perpendicular pins at the free ends of the arms, a supplemental arm pivoted to one of the aforesaid arms intermediately to swing in a plane parallel thereto, the supplemental arm extending in the direction of the pivot of the first arms, spring strips secured to the inner face of the supplemental arm adjacent its free end, a rod connected to the spring strips and extending across the other arm in the same plane with the supplemental arm, a clamp mounted on the other arm to receive and clamp the rod and an adjusting screw mounted in the supplemental arm and engaging the spring strips.

4. A device of the character described including a pair of pivoted arms, perpendicular pins at the free ends of the arms, a supplemental arm pivoted to one of the aforesaid arms intermediately to swing in a plane parallel thereto, the supplemental arm extending in the direction of the pivot of the first arms, spring strips secured to the inner face of the supplemental arm adjacent its free end, a rod connected to the spring strips and extending across the other arm in the same plane with the supplemental arm, a clamp mounted on the other arm to receive and clamp the rod, one of said springs being thinner and longer than the other spring and adapted to buckle intermediately, and a set screw threaded through the supplemental arm near its pivoted end to engage the adjacent face of the heavy spring for adjusting the first named arms in spaced angular relation in addition to the adjustment thereof at the rod extending through the clamp.

5. A space measuring device including a pair of arms pivotally connected near one end, pins at the free ends of the arms, a bar pivoted on one arm, a resilient member carried by the bar and a rod carried by the resilient member and adjustably connected to the other arm.

6. A space measuring device including a pair of arms pivotally connected near one end, pins at the free ends of the arms, a bar pivoted on one arm, a resilient member carried by the bar, a rod carried by the resilient member and adjustably connected to the other arm and means for additionally adjusting the rod by adjustment of the resilient member relative to the bar.

7. A space measuring device including a pair of arms pivotally connected near one end, a bar pivoted on one arm, a resilient member carried by the bar, a rod carried by the resilient member and a clamp pivoted to the other arm to receive and hold the rod in adjusted position.

8. A space measuring device comprising a pair of pivoted arms and means for adjusting the spacing of the arms, said means comprising a straight bar pivoted near one end to one arm, a spring connected to the inner face and end of the bar, a rod rigidly connected to the inner face of the spring near its outer end and extending across the other arm, means on the bar to adjust the spacing of the spring relative thereto and means on the latter arm for clamping the rod.

JOHN NYBERG.